United States Patent [19]

Bowdish

[11] 4,042,671
[45] Aug. 16, 1977

[54] PROCESS FOR LEACHING SAND OR OTHER PARTICULATE MATERIAL

[76] Inventor: Frank W. Bowdish, 2440 Eleventh St., Sparks, Nev. 89431

[21] Appl. No.: 594,857

[22] Filed: July 10, 1975

[51] Int. Cl.² .............................................. C01B 33/12
[52] U.S. Cl. ................... 423/340; 23/272 R; 75/101 R; 423/1; 423/658.5
[58] Field of Search ............... 423/1, 340, 150, 658.5; 75/101 R; 23/270 R, 272 R

[56] References Cited

U.S. PATENT DOCUMENTS

| | | | |
|---|---|---|---|
| 1,084,600 | 1/1914 | Best | 75/101 R |
| 1,897,638 | 2/1933 | Hubbell | 423/340 |
| 1,957,579 | 5/1934 | Crew | 423/340 |
| 1,983,271 | 12/1934 | Earle | 423/340 |
| 2,119,105 | 5/1938 | Hutchinson et al. | 423/340 |
| 2,169,122 | 8/1939 | Crew | 423/340 |
| 2,233,695 | 3/1941 | Crew | 423/340 |
| 2,306,021 | 12/1942 | Knowles et al. | 423/340 |
| 2,952,516 | 9/1960 | Gross | 423/340 |
| 3,880,981 | 4/1975 | Garingarao et al. | 423/150 |

Primary Examiner—O. R. Vertiz
Assistant Examiner—Wayne A. Langel
Attorney, Agent, or Firm—McDougall, Hersh & Scott

[57] ABSTRACT

A process for leaching sand to remove iron and other undesirable components in which the sand is treated with a series of leaching solutions which increase in acid concentration to about the midpoint of the process followed by decrease in concentration to a final wash water with the initial drainage from the sand mass being discarded while subsequent drainages are re-used for subsequent leaching operations with the addition of leaching acid to some of the drainage to provide the desired acid concentration.

15 Claims, 1 Drawing Figure

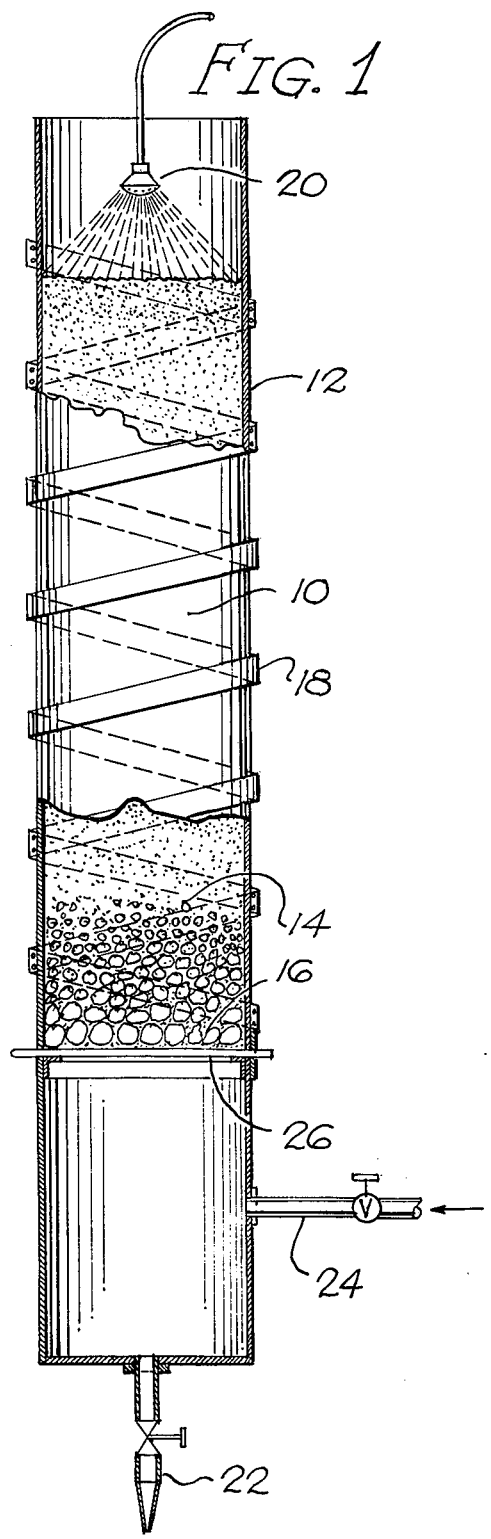

PROCESS FOR LEACHING SAND OR OTHER PARTICULATE MATERIAL

This invention relates to a method for leaching particulate matter and more particularly to the leaching of sand for the removal of metallic components, such as iron, which interfere with the use of the sand as a glass or ceramic ingredient.

In my previously issued U.S. Pat. No. 3,374,062, description is made of a process for the removal of iron and its compounds from sand by first subjecting the sand to magnetic separation for the removal of particulate matter having a high iron content, and then subjecting the remainder to acid leaching by first heating the sand to elevated temperature and then loading the hot sand in a leaching tank, introducing a hot acidic solution from the bottom side of the tank to rise gradually through the column of sand whereby the major removal by solution of iron will take place in that portion of the solution which remains at the top of the column. As a result, such leaching solution can be removed by overflow to carry off the solution containing the highest concentration of iron. Thereafter the remainder of the solution is drained back through the bottom side of the column with the addition of a wash water at the top at a rate corresponding to the rate of removal so as to keep the column of sand covered with liquid, while at the same time washing the acid leach from the sand.

It has been found that the upward injection of acid leaching solution and the downward drainage requires the use of a vessel that is leak-proof and impervious to the acid leaching solution and that the vessel be provided with a filter at the bottom. The above has required the use of rubber lined vessels but even then leakage through pin holes in the lining has lead to acid attack on the walls of the metal vessel. The bottom filter required frequent cleaning, repair and replacement because of the clogging by calcium sulfate formed during the leaching operation.

The upward injection of leaching solution and downward drainage exposed the sand in the lower portions of the column to treatment over a longer period of time than the remainder whereby regulation of the process based upon the time needed to treat the upper portions of the sand column resulted in a time consuming process with excessive exposure of the portions of the treated sand in the lower portion of the column.

The improvement which forms the subject matter of this invention is predicated upon my finding that sands of the type described do not have to be saturated with acid leaching solution in order for their iron content to be effectively dissolved. It is sufficient if the sand is merely moistened with the leaching solution to the extent that mechanical mixing might even be required to effect the desired uniform distribution of the leaching solution for wetting of the surface of the sand particles. Thus the desired solubilization of the iron can be effected with but a fraction of the leaching solution required to saturate the sand with reliance being had upon the wash water to remove iron which has been solubilized by the acid. Thus the amount of acid used is so small that it can be discarded thereby to provide for clean removal of iron with the loss of a minimum amount of acid.

It has also been found that if the flow rate of solution is maintained at a very low level, solution can be drained through a mass of damp sand while at rest upon a porous supporting surface, such as a bed of pebbles or other coarse material, without flushing the sand through the bed. Such drainage can be caused to take place until only a few per cent moisture remains in the sand. Retained solution is sufficient to wet the surfaces of the sand grains so that acid leach in sufficient amounts is retained by the sand particles and water or other wash solution applied slowly to the top of the sand pile will effectively displace the solution moistening the sand.

These concepts have been combined in arriving at the improved process forming the subject matter of this invention.

In one embodiment of the invention, the sand to be leached is housed within a vertical cylindrical shell open at both ends, while it rests on a pebble bed at the bottom. Instead, the leaching operation could be carried out with the sand in an open pile. It is contemplated, however, that in commercial practice, the sand will rest on a drain bed that is relatively flat, inclined or of dished shape, while it is restrained from spreading out by the shell or other retaining walls. The walls should be protected from acid attack, as by a plastic or rubber liner or by membranes which overlap the upturned edges of adjacent lower membrane, in shingle fashion, and which may be sealed one to the other, but which need not resist appreciable hydrostatic pressure because of the free drainage of the solution. It is further contemplated that the walls of the leaching chamber may be provided with an opening through which a front end loader or other machine may enter to remove the sand after the leaching, washing and drainage operations have been completed. Otherwise the leached and washed sand may be removed by other conventional techniques for transport, such as a screw conveyor, belt conveyor, or the like.

When the sand to be leached is placed in the leaching chamber, it may be either wet or dry, the only requirement being that it not be so wet or so dry that it can be washed or will flow into and clog the drainage system. If the leaching is carried out at elevated temperature, the sand may be heated before being placed in the leaching chamber or it may be heated while in the chamber. In one embodiment of the improved method, the sand is heated while in the leaching chamber, as by electric resistance heating tapes wrapped around the outside of the chamber. Another practical method for heating the sand on a commercial scale would be by injecting steam through perforated pipes beneath the column of sand. Such steam would pass upwardly through the sand to heat the sand by direct condensation and the condensate would drain by gravitational flow. The same set of perforated pipes can be used both for steam injection and for drainage. It will be understood that the improved leaching method of this invention may be used in the absence of elevated temperature.

Once the sand to be leached has been placed in the leaching chamber and heated to the required temperature, application of leaching solution may be initiated. Any suitable method of application may be employed, such as by spraying, sprinkling, flooding or flowing the leaching solution onto the sand pile from small orifices. The leaching solution should be distributed evenly over the top surface of the column of damp sand. Solutions preheated to elevated temperature may be employed where it is desired to accelerate the leaching operation by carrying out the reaction at elevated temperature.

Solutions applied slowly to the top of the sand mass displaces whatever solutions are already in the sand pile, as the applied solution drains downwardly gravitationally through the mass. Chemical reactions can take place between the sand and the advancing solution to effect the desired solubilization and extraction of solubilized iron. After a certain time lag depending somewhat upon the depth of the sand mass and the rate of application of solution, solution will drain from the mass of sand. This application of solution and drainage may be carried out as a continuous operation or the application may be halted with the drainage continuing for additional time, at a decreasing rate.

The solutions that drain from the sand will vary more or less continuously in composition, to reflect the composition of feed solution, reactions with the sand, and the mixing of solutions due to imperfect displacement. As the solutions drain from the bottom of the sand mass, they can be segregated into different portions based upon composition, or other criteria. Each of these different portions may either be disposed of or utilized in an appropriate manner as by re-use in treatment of succeeding batches of sand, as will hereinafter be described.

By adjusting the solution in use to the chemical condition of the sand, more complete and economical use may be made of acid or other reagents in the solution. Another advantage is that acid contained in low concentration in wash solution may be utilized to perform the acid consuming leaching reaction at the beginning of a succeeding batch instead of being discarded, as in a single solution leach. Because much of the acid required for chemical reaction with constituents of sand may be supplied by portions of weak solution drained from treatment of a previous batch, the new or make-up acid or other reagents required for the process can be added to that portionof previously treated solution can be added to that portion of previously treated solution which is strongest in such reagents thereby to prepare full strength leaching solution with a minimum amount of additional material.

The following describes the general procedure of this invention, given by way of illustration and not by way of limitation.

FIG. 1 is an elevational view, with parts broken away, of an appartus used in the practice of this invention.

In one embodiment of the process of this invention, solutions of seven different compositions are used in succession after the damp sand has been placed in the leaching chamber and heated. All of the solutions are applied at an elevated temperature, such as at a temperature within the range of 150°-210° F. The first solution to be applied has a relatively high iron content and low acid content. It contains a portion of the solution drained from a previous batch immediately after that portion of the drainage which was set aside for disposal because substantially all of the acid was used up and the solution therefore contained a high concentration of iron. The applied solution may also contain some wash solution low in both iron and acid content derived from the drainage near the end of treatment of a previous batch of sand.

The second solution to be used is also high in iron content but somewhat higher in acid than the previous solution. It generally contains a portion of the drainage from a previous batch with an increasing acid content and may also contain wash drainage of appropriate acid strength. The acid in both of these solutions may be largely consumed by easily soluble constituents of the sand, such as carbonates and soluble iron compounds. Thus a portion of the drainage from these solutions may be disposed of to eliminate iron without discarding very much acid.

The third solution is as high in acid as it is possible to segregate from the drainage of a previous batch while leaving the portion of highest strength necessary for the preparation of the fourth leaching solution increment. This may contain drainage from both before and after the strongest acid solution from a previous batch. It provides acid for leaching some constituents of the sand which require a stronger solution than the first two solutions and it minimizes the forward dilution of the leaching solution to follow.

The fourth or leach solution may contain considerable iron but its main property is its acid strength. It is prepared by adding strong make-up acid or other reagents to a portion of the drainage from a previous batch, preferably from that with the highest acid content. There are a number of criteria desired for this solution. It should be strong enough to complete the leaching of the sand. If this completion of leaching requires more time than for the solution to drain through the sand mass, it should have sufficient volume to displace effectively the previous solution from all of the sand mass. In the latter instance, the sand moistened with the strong solution may then be allowed to soak for a period of time required to complete solubilization of the iron. Another criteria for the preparation of this fourth solution is that acid consumption and loss should be balanced by the quantity of make-up acid that is used. Otherwise, the quantity and/or concentration of solution may vary from batch to batch.

The fifth and sixth solutions are of relatively low acid concentration derived from the drainage of a previous batch that followed the high acid portion and which were not used in making up the first three solutions. The sixth solution includes the very low acid water that drains during the final portion from the previous batch.

Finally, the seventh solution is wash water which may be used in any quantity required to remove acid and solubilized iron to the desired level from the sand. Generally more wash water is used than required to displace the previous solution because the volume of solution removed to eliminate iron, when added to the water lost, as by evaporation, may logically be made up by the amount of wash water that is added.

In this embodiment of the process of this invention, solutions drain freely from the bottom of the mass of sand during treatment. Because these drained solutions change almost constantly in composition, they are segregated into different fractions for discard or for re-use in the treatment of a subsequent batch of sand. Typically, this drainage starts with water displaced from the damp sand. Then the drainage may contain part of the first solution from which acid and iron have been removed by reaction with carbonates. Next very strong iron solution appears as the precipitated iron is redissolved along with iron from the sand. If this is permitted to mix with the previous drainage, iron may again be precipitated only to be dissolved again when sufficient acid appears. Gradually, the free acid content increases and the iron content decreases in the drainage as leaching of the sand mass progresses.

When the leach solution mixed with the strong third solution begins to break through, the acid strength rises sharply and reaches a maximum somewhat lower than the strength of the corresponding leach solution fed to the top of the sand mass. After a plateau of high acid strength, the acid content decreases slowly in the drainage as well as the iron content. This decrease becomes more rapid as the wash solution and water break through. Finally the drainage may be very low in both iron and acid content. Naturally there is a considerable lag between the time when the application of wash water ends and the drainage effectively stops.

The following are specific examples which illustrate the practice of the improved leaching process of this invention. The leaching of the batch of sand described was one in a series of similar leaches in which the treated solutions were used in succeeding batches of fresh sand.

EXAMPLE 1

Wet sand 10 to be leached, containing 5 kilograms of dry sand, was placed in a leaching chamber 12 on top of a thin layer 14 of coarse moist sand that rested on a bed of pebbles 16. The latter are supported on closely spaced rods 26 which are replaceably mounted through sealed openings in the walls of the chamber for release to enable the layers of coarse sand and pebbles to be dumped. Some water drained from the open bottom as the sand was heated, as by electrical tapes 18 on the outside of the chamber. This source of heat can be replaced or supplemented by admitting steam through inlet 24 for passage upwardly through the sand, or by preheating the sand before being loaded into the leaching chamber.

Each of the series of the following solutions was heated to higher than 150° F and sprayed from spray head 20 onto the top of the sand column 10 at a rate to enter the sand column without accumulating as a puddle on top.

The application of solution was not continuous, there being interruptions of a few minutes between different increments of solutions and a soaking period of nine hours following the fourth or leaching solution. The free acid contents were determined by titration of diluted samples with caustic to a change in color by methyl orange, at about pH 3. Thus acid associated with dissolved iron is not included in the tabulation. Volumes of solution are expressed as percent by weight of dry sand, assuming a specific gravity of unity, as well as in milliliters. Qualitative determinations of iron were made.

Table I

| Solution | Volume ml. | Volume % dry sand | Free $H_2SO_4$ g/l | Quantity of Acid g. | Quantity of Acid lb/ton sand | Iron Content |
|---|---|---|---|---|---|---|
| Water to wet dry sand | 1000 | 20.00 | — | — | — | None |
| First | 368 | 7.36 | 13.9 | 5.12 | 2.05 | Very high |
| Second | 473 | 9.46 | 35.8 | 16.93 | 6.77 | Very high |
| Third | 256 | 5.12 | 65.8 | 16.85 | 6.74 | High |
| Fourth or Leach | 527 | 10.54 | 186.5 | 98.29 | 39.32 | Intermediate |
| Fifth | 325 | 6.50 | 6.6 | 2.15 | 0.86 | Low |
| Sixth | 300 | 6.00 | 1.5 | 0.45 | 0.18 | Very Low |
| Seventh or Wash | 1500 | 30.00 | — | — | — | None |
| Total | 4749 | 94.98 | | 139.79 | 55.92 | |

The solutions that drained from the sand were collected at spigot 22, as 30 separate portions. The volume of each was measured and the free acid content was determined for each, except for the first two which had relatively no free acid. The data are given in Table II together with calculated quantities of free acid.

Table II

Drained Solutions

| Solution No. | Volume ml | Free Acid Conc. g/l | Free Acid g. | Solution No. | Volume ml | Free Acid Conc. g/l | Free Acid g. |
|---|---|---|---|---|---|---|---|
| 1 | 590 | — | — | 16 | 136 | 60.4 | 8.21 |
| 2 | 400 | — | — | 17 | 75 | 112.2 | 8.40 |
| 3 | 84 | 6.8 | 0.57 | 18 | 70 | 113.2 | 7.92 |
| 4 | 98.5 | 6.5 | 0.64 | 19 | 81 | 114.8 | 9.29 |
| 5 | 64 | 9.8 | 0.63 | 20 | 70.5 | 111.8 | 7.88 |
| 6 | 60 | 12.0 | 0.72 | 21 | 70 | 87.6 | 6.14 |
| 7 | 57.7 | 16.3 | 0.94 | 22 | 70 | 76.7 | 5.37 |
| 8 | 47 | 16.6 | 0.78 | 23 | 66.5 | 70.4 | 4.68 |
| 9 | 66 | 19.3 | 1.27 | 24 | 134 | 49.8 | 6.68 |
| 10 | 62 | 20.7 | 1.29 | 25 | 123 | 32.4 | 3.98 |
| 11 | 55 | 21.8 | 1.20 | 26 | 168 | 22.6 | 3.80 |
| 12 | 63.5 | 25.0 | 1.59 | 27 | 182 | 12.25 | 2.23 |
| 13 | 66 | 31.3 | 2.07 | 28 | 190 | 6.5 | 1.23 |
| 14 | 54 | 36.0 | 1.94 | 29 | 294 | 3.5 | 1.03 |
| 15 | 61 | 42.7 | 2.61 | 30 | 465 | 0.3 | 0.14 |
| | | | | Totals | 4023.5 | | 93.23 |

The iron content, as judged by their color, decreased gradually from numbers 3 to 30, the latter of which had only a trace when tested with potassiumm ferrocyanide. The final drainage into segment 30 showed almost no color when so tested. No. 1 was iron free while No. 2 contained iron precipitated as a sludge as well as some iron in solution.

It will be noted that, whereas the solution fed to the top of the sand carried a total of 140 grams of sulfuric acid, the re-usable drainage solution from Nos. 6 to 30 had only 91 grams. The difference of 49 grams was lost, discarded or consumed by reaction with the sand. This amount to about 20 pounds per ton of sand, representative of an economical utilization of acid.

The leached and drained sand, upon removal and drying, was found to contain 8.1% moisture, when calculated on a dry basis. Treatment by the leaching process of this invention effectively removed leachable iron from the sand because, after removal of magnetic material, the refined sand contained only 0.055% $Fe_2O_3$. When the soaking time is increased to 19 hours, the $Fe_2O_3$ content of the final product is reduced to 0.04%.

When preparations were made for leaching the next batch of sand, most of the drainage solutions listed above were re-used in making up the new feed solution. Solutions No. 2 through No. 5 were set aside for discard in order to reject iron. Low acid, high iron content solutions were prepared by combining portions 6 through 10 and 27 to give a new first solution. Portions 11 through 14, 25 and 26 were combined for a new second solution. Portions 15, 16 and 24 were combined to make up the third solution. Portions 17 through 23 were combined and 50 grams of concentrated sulfuric acid was added to prepare a new fourth or leaching solution. Portions 28 and 29 were combined to make the new fifth solution and portion 30 the sixth solution for the treatment of the next batch of sand.

Since the fifth and sixth solutions are larger in volume than the corresponding previous solutions, less wash water may be required in the treatment of the next batch of sand. Of the 725 ml difference between the volume of solution used and that recovered, about 420 ml remained a moisture in the sand and 305 ml was lost, mainly by evaporation from the hot solution and sand.

EXAMPLE 2

This example makes use of steam for heating the sand and hydrochloric acid as the acid used in the leaching solutions. 5 kilograms of moistened sand was loaded into the leach vessel of Example 1 to form a column on the top of the bed formed of pebbles and coarse sand. It was heated by passing steam upwardly through the column and thereafter the temperature of about 150°–210° F was maintained with heating tapes.

The following series of feed solutions was prepared from the drainage of a previous batch with fresh hydrochloric acid added only to the fourth or leach solution.

Table III

| Solution No. | Volume ml | % dry sand | Free HCl g/l | Quantity of Acid g | lb/ton sand | Iron Content |
|---|---|---|---|---|---|---|
| First | 450 | 9.00 | 14.6 | 6.57 | 2.61 | Relatively low* |
| Second | 380 | 7.60 | 34.7 | 13.19 | 5.27 | Very high |
| Third | 325 | 6.50 | 102.5 | 33.31 | 13.33 | High |
| Fourth | 633 | 12.66 | 178 | 112.67 | 45.00 | Medium high |
| Fifth | 642 | 12.84 | 1.5 | 0.96 | 0.38 | Low |
| Sixth** | 650 | 13.00 | None | None | None | None |
| Seventh*** | 750 | 15.00 | " | " | " | " |
| Total | 3830 | 76.6 | | 166.7 | 66.6 | |

*Iron relatively low because this was a wash solution.
**First drain solution from this batch.
***Water.

Upon passage through the sand column, the drainage was collected as the following series of solutions. The first solution was water and condensate from the steam that drained out before any iron appeared. This was returned as the sixth feed solution for washing the batch of sand.

Table IV

| Solution No. | Volume, ml | Free HCl Conc., g/l | g |
|---|---|---|---|
| 1 | 650 | — | — |
| 2 | 425 | None* | |
| 3 | 360 | 26.72 | 9.62 |
| 4 | 336 | 87.75 | 29.48 |
| 5 | 570 | 118.36 | 67.47 |
| 6 | 610 | 10.92 | 6.66 |
| 7 | 540 | 0.20 | 0.11 |
| 8 | 400 | Trace | None |
| Total | 3891 | | 113.34 |

The hydrochloric acid consumed or lost in this example amounted to only 21.3 pounds per ton of sand treated. Upon removal of magnetic material, the refined sand analyzed 0.042% $Fe_2O_3$.

In review, the process starts with an acid solution nearly saturated with dissolved iron from previous use so that the drainage from this portion will be substantially exhausted with respect to acid and can be discarded with little if any acid waste. The process continues with increasing concentrations of acid in solution to a maximum at about midway through the process. Thereafter, the additions make use of solutions with decreasing acid concentration until final wash with water free of acid. Thus the drainage from the solutions can be stepped forward in sequence of application with addition of acid made only to the solution of highest acid concentration applied about midway through the process thereby to provide an acid concentration in solution sufficient to react to effect of the more difficult iron and iron compounds.

Thus the acid tapers of in concentration in both directions from the midpoint of the process.

As the leaching acid, it is preferred to make use of hydrochloric acid or sulphuric acid, but other inorganic acids in which iron or its compounds are soluble can be used.

The concentration of acid can best be described with reference to the solution of highest acid concentration used at the midpoint of the process. For this purpose, it is sufficient to make use of a solution having a concentration of 150 to 180 grams $H_2SO_4$ or HCl per liter of solution with the acid content tapering gradually forwardly and more rapidly in the after-applied solutions.

Preheat of the sand and/or the acid leaching solution is desirable for purposes of accelerating the solubilization of the iron and its compounds. For this purpose, the sand and/or the acid solutions may be heated for reaction at a temperature up to 212° F but for optimum control it is desirable to limit the upper temperature to about 200° F, and preferably within the range of 150°–200° F. Lower temperatures can be used down to ambient temperature, but then more soaking time should be allowed, especially with the application of solutions of highest acid concentration to allow the reaction to proceed to the desired state of completion.

As previously pointed out, while best practice makes use of a housing in which the batch of sand is confined, the process can be carried out on an open pile of sand with means for support and collection of drainage for re-use in the manner described.

It will be understood that changes may be made in the details of construction, arrangement and operation, without departing from the spirit of the invention, especially as defined in the following claims.

I claim:

1. A process for leaching iron and other metallic compounds from sand with a series of aqueous solutions of differing compositions differing in concentrations of leaching component in the form of an acid, in which the aqueous solutions are fed to the top of the mass of the sand and permitted to drain through gravitationally with appropriate periods of time between solutions for reaction, said solutions of differing compositions forming series which begin with solutions low in concentration of the leaching component and continue with solutions of higher concentration of the leaching component until the solution of highest strength in the series has been reached at about midway through the leaching operation, after which solutions of progressively lower concentrations follow until the series of solutions terminate with one low in concentration of the leaching component, ending with a wash water, said solutions, except for the wash water, being made up largely of the drainage from a previous batch leach, to some of which leaching component is added to increase the concentration.

2. A process as claimed in claim 1 in which the batches of sand to be leached are retained by a vertically disposed wall.

3. A process as claimed in claim 2 in which the walls retaining the sand mass have one or more access openings for removal of the sand after leaching.

4. A process as claimed in claim 3 in which the openings in the retaining wall will admit earth moving equipment to remove the leached sand.

5. A process as claimed in claim 2 in which the walls are protected with a material that is resistant to the acidic leaching solution.

6. A process as claimed in claim 1 in which the base on which the sand rests comprises drainage pipes to facilitate the removal of drained solution and in which the base is supported on an impervious layer to avoid the loss of said solutions.

7. A process as claimed in claim 6 in which steam is injected through the pipes used for drainage of solution.

8. A process as claimed in claim 1 in which the drainage solutions for each leach batch are collected and segregated into different portions for removal of the first increments from the system and for re-use of the other increments in a subsequent leach operation.

9. A process as claimed in claim 8 in which part of the drainage solution is removed from the system as product and as discard in order to avoid an undesirable buildup of dissolved matter in the solutions to be used in subsequent batch leaches.

10. A process as claimed in claim 1 in which the leaching component is an inorganic acid.

11. A process as claimed in claim 10 in which the inorganic acid is selected from the group consisting of HCl and $H_2SO_4$.

12. A process as claimed in claim 1 in which prior to leaching steam is injected into the sand mass in order to raise the sand to elevated temperature for reaction.

13. A process as claimed in claim 12 in which the steam is injected into the sand mass from the bottom side for passage upwardly through the mass of sand.

14. A process as claimed in claim 1 in which the and and/or solutions is heated for carrying out the leaching operation at elevated temperature.

15. A process as claimed in claim 1 in which each batch of sand to be leached is piled on a base of gravel, pebbles, broken rock, coarse sand or other coarse particulate material to facilitate drainage of the solution through and from the sand pile.

* * * * *

UNITED STATES PATENT OFFICE
CERTIFICATE OF CORRECTION

Patent No. 4,042,671    Dated August 16, 1977

Inventor(s) Frank W. Bowdish

It is certified that error appears in the above-identified patent and that said Letters Patent are hereby corrected as shown below:

col. 3, lines 35 and 36, delete "can be added to that portion of previously treated solution" (it is a repetition of phrase immediately preceding it)

col. 7, bottom line has been omitted - add under Table IV, -- * Drainage contained precipitated iron -- col. 10, line 22, change "and" to -- sand --

Signed and Sealed this

Thirty-first Day of January 1978

[SEAL]

Attest:

RUTH C. MASON  
Attesting Officer

LUTRELLE F. PARKER  
Acting Commissioner of Patents and Trademarks